United States Patent [19]

DeFusco

[11] 4,043,239

[45] Aug. 23, 1977

[54] SHIM NUT AND SCREW BOLT ASSEMBLY

[75] Inventor: Ernest L. DeFusco, Clawson, Mich.

[73] Assignee: General Motors Corporation, Detroit, Mich.

[21] Appl. No.: 649,791

[22] Filed: Jan. 16, 1976

[51] Int. Cl.² .................................... F16B 35/00
[52] U.S. Cl. .................................. 85/1 R; 85/1.5 R; 151/7
[58] Field of Search ................ 85/1 R, 1.5 R; 151/7, 151/16; 33/154 R, 154 C, 154 E, 154 F, 163; 52/758 F, 758 N; 403/299, 343, 296

[56] References Cited

U.S. PATENT DOCUMENTS

| 556,279 | 3/1896 | Richards | 85/1 R X |
|---|---|---|---|
| 932,395 | 8/1909 | Kenney | 85/1 R |
| 1,096,070 | 5/1914 | Stull | 85/1 R |
| 1,138,574 | 5/1915 | King et al. | 151/16 |
| 1,212,126 | 1/1917 | Canfield | 85/1 R |
| 1,374,615 | 4/1921 | Talty | 85/1 R |
| 2,199,802 | 5/1940 | Leitz et al. | 85/1 R |
| 2,487,811 | 11/1949 | Karvis | 85/1 R X |
| 3,163,079 | 12/1964 | Schertz | 85/1 R |
| 3,308,865 | 3/1967 | Raichelson et al. | 151/7 |
| 3,908,727 | 9/1975 | Osborne | 151/7 |

FOREIGN PATENT DOCUMENTS 1,021,911    2/1953    France ................... 151/16

Primary Examiner—Roy D. Frazier
Assistant Examiner—Rodney H. Bonck
Attorney, Agent, or Firm—Arthur N. Krein

[57] ABSTRACT

A shim nut and screw bolt assembly for rigidly securing together a pair of spaced apart components, the shim nut of this assembly having internal threads and opposite hand external threads which threadedly engage a nut fixed to or forming part of the first component, a screw bolt of this assembly extending through an aperture in the second component and having its threaded shank in threaded engagement with the internal thread of the shim nut whereby rotation of the screw bolt in a fastener direction will first cause the screw bolt to extend into the shim nut a sufficient axial distance whereby friction between this screw bolt and the shim nut then becomes such that the shim nut will be rotated to move it a sufficient axial distance outward relative to the first component into abutment with the second component after which, further rotation of the screw bolt in the fastening direction, will effect securement of the second component to the shim nut by the screw bolt and thereby attachment of the second component to the first component in spaced apart relation thereto.

4 Claims, 3 Drawing Figures

SHIM NUT AND SCREW BOLT ASSEMBLY

This invention relates to a fastener assembly for securing together a pair of spaced apart components and, in paritcular, to a shim nut and screw bolt assembly for securing these components together.

In certain assemblies of one component to another, it is necessary, when these components are spaced apart relative to each other, to insert one or more shims between these components whereby one component can be rigidly secured to the other component by a conventional fastener assembly, such as a bolt and nut assembly. However, it has now been found that in certain assemblies of such spaced apart components, there is little or no room to permit the insertion of a shim or shims between the components and, it will be apparent that in such assemblies, a conventional bolt and nut assembly would not be adequate to provide a suitable means for securing the components of such an assembly together.

Accordingly, it is the primary object of this invention to provide a shim and screw bolt assembly for securing together spaced apart components whereby the shim of such a shim and screw bolt assembly is in the form of a shim nut that is operable as both a fastening nut and as a shim.

Another object of this invention is to provide an improved fastener for securing together spaced apart components, the fastener including an internally and externally threaded nut cooperating with an internally threaded aperture in one component and with a screw bolt whereby the nut serves as a shim of automatic variable shim thickness.

These and other objects of the invention are obtained by a shim nut and screw bolt assembly for securing together a pair of spaced apart components, such as spaced apart panels, the shim nut and screw bolt assembly including a shim nut in the form of a tubular element or bushing having both an internal thread and an opposite hand external thread which is used in cooperation with a bolt screw as a shim between a pair of panels secured together by a screw bolt, the shim nut being first fully threaded into an internally threaded anchor on the first panel and then the second panel is fixed thereto by the screw bolt which, when first driven into threaded engagement with the internal threads of the shim nut, causes the shim nut to start unthreading from the anchor until it abuts against the second panel after which the screw fastener is driven further into the shim nut to secure the second panel thereto.

For a better understanding of the invention, as well as other objects and further features thereof, reference is had to the following detailed description of the invention to be read in connection with the accompanying drawings, wherein.

Figure 1:
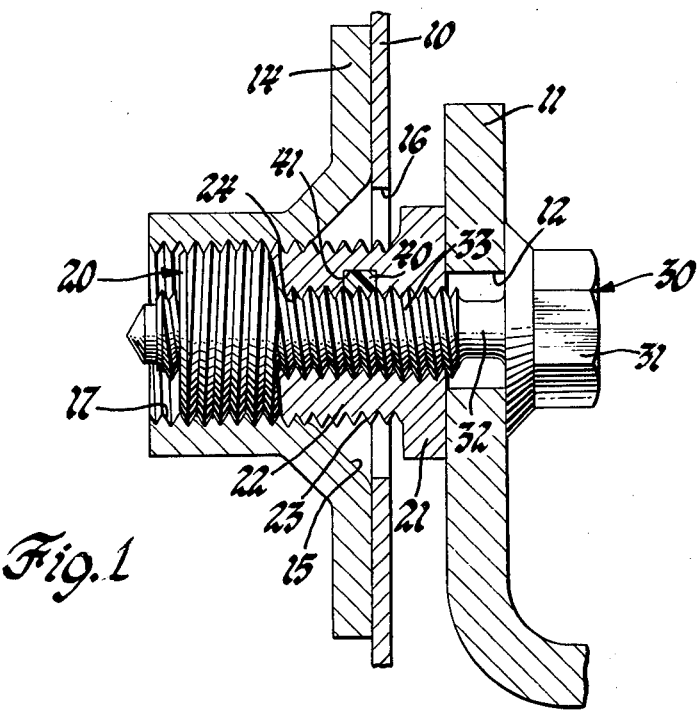
FIG. 1 is a sectional view through a panel assembly having incorporated therein a shim nut and screw bolt assembly in accordance with the invention and showing the bolt and shim nut of this assembly positioned whereby a first panel is rigidly secured to a second panel.

Referring now to the drawings, there is illustrated a pair of components 10 and 11 which are to be assembled together but in spaced apart relation to each other. The component 10 may, for example, be an apertured fender attachment component of a motor vehicle body, while the component 11 may be a hinge bracket component, which are to be assembled together in a vehicle body assembly in a location at which there is little or no room adjacent to these components to permit the placement of a conventional shim between these components whereby they can be rigidly secured together.

In the construction shown, the component 10 is provided with a threaded aperture or anchor as by having, in the embodiment illustrated, a sheet metal stamped nut 14 suitably secured thereto as by spot welding so that the through aperture 15 of this nut is coaxially aligned with the bolt receiving aperture 16 in the component 10. At least a portion of the internal peripheral wall of the nut 14, formed by the aperture 15 therethrough, is provided with internal threads, such as left-hand threads 17, for a purpose to be described. The component 11 is also provided with a bolt receiving aperture 12.

Now in accordance with the invention, the components 10 and 11 are secured together by a shim nut and screw bolt assembly that includes a shim nut, generally designated 20, and a screw bolt, generally designated 30.

Figure 2:
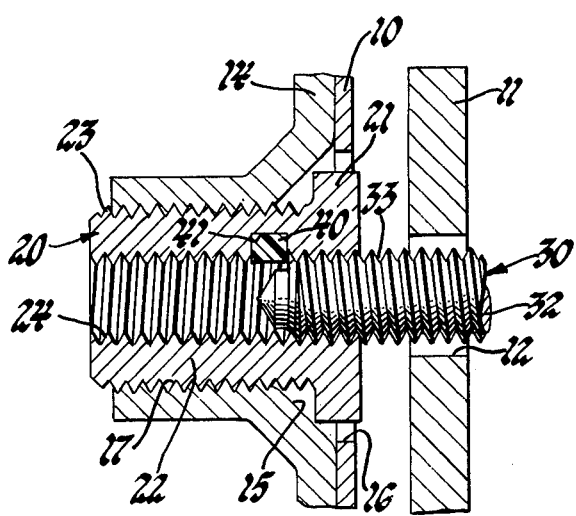
FIG. 2 is a sectional view similar to FIG. 1, but showing the shim nut fully inserted into a threaded anchor fastened to the first panel out of engagement with the second panel; and, FIG. 3 is a view corresponding to FIG. 1, but showing an alternate embodiment of the subject shim nut and screw bolt assembly of the invention.

The shim nut 20 which is in the form of a tubular element or bushing has, in the embodiment illustrated in FIGS. 1 and 2, an enlarged head 21 and a shank 22 of reduced diameter extending from the head. The shank 22 is provided with external threads 23 formed complementary to threads 17 of the nut 14. The shim nut 20 is also provided with an aperture therethrough provided with internal threads 24 of opposite hand relative to the external threads 23, that is, the threads 24 would be right-hand threads in the embodiment described.

The screw bolt 30 has a suitable external wrenching head, such as the washer hex head 31 with a shank 32 extending therefrom in the embodiment illustrated. The shank 32 is provided with external threads 33 formed complementary to the internal threads 24 of shim nut 20. Preferably, either the internal threads 24 of the shim nut or the external threads of the shank 32 of the screw bolt are provided with a suitable self-locking feature as by using a nylon or plastic insert embedded in the threads or bonded to the threads as a patch or pad which develop prevailing torque locking action. Alternately, a special thread form on either the internal threads of the shim nut or on the threads of the screw bolt 30 can be used to provide the prevailing torque locking action. In the embodiment disclosed, this self-locking feature is obtained by providing a nylon button 40 positioned in a suitable cavity 41 provided for this purpose in the threaded bore portion of the shim nut 14 whereby the nylon button 40 is normally positioned to be in interference relationship with the threads of the shank 32 of the screw bolt when it is threaded into the shim nut, in a manner well known in the art.

During assembly of the component 11 to the component 10, the shim nut is first preassembled to the nut 14 so that the shim nut is fully threaded therein to the axial preassembled position shown in FIG. 2. After this, the component 11 is positioned adjacent to but spaced from the component 10 and the shank 32 of the bolt 30 is then inserted through the aperture 12 of the component to engage the internal threads 24 of the shim nut 20. As the screw bolt 30 is then rotated in a fastening direction, as determined by the hand of the threads 33 on the shank 32, these threads of the screw bolt will engage the buton 40, or other thread locking feature incorporated into these elements, whereby the torque resistance increases until the friction between the threads 33 of the screw bolt and the internal threads 24 of the shim nut increase sufficiently so that the shim nut 20 then begins to rotate with the screw bolt so that the shim nut withdraws from the nut 14 axially in a direction outward relative to the component 10 until it comes into abutment with the component 11 which then limits further axial movement and therefore rotation of the shim nut 20. The shim nut thus automatically fills or shims the gap between the component 10 and the component 11. The shim nut 20 thus serves the function of an automatic self-adjustable shim. This axial movement of the shim nut 20 as rotated by the screw bolt 30 is affected due to the fact that the external threads of the shim nut 20 and internal threads of nut 14 are of opposite hand to those of the screw bolt 30 and to the internal threads of the shim nut 20.

The screw bolt 30 is then driven further in a fastening direction until its washer head 31 bottoms on the opposite side of the component 11 from shim nut 20, thus completing the assembly. As can be seen in FIG. 1, the component 11 is then rigidly secured to the component 10 in spaced apart relation thereto with the enlarged head 21 of the shim nut providing a suitable clamping surface against which the component 11 is secured.

Figure 3:
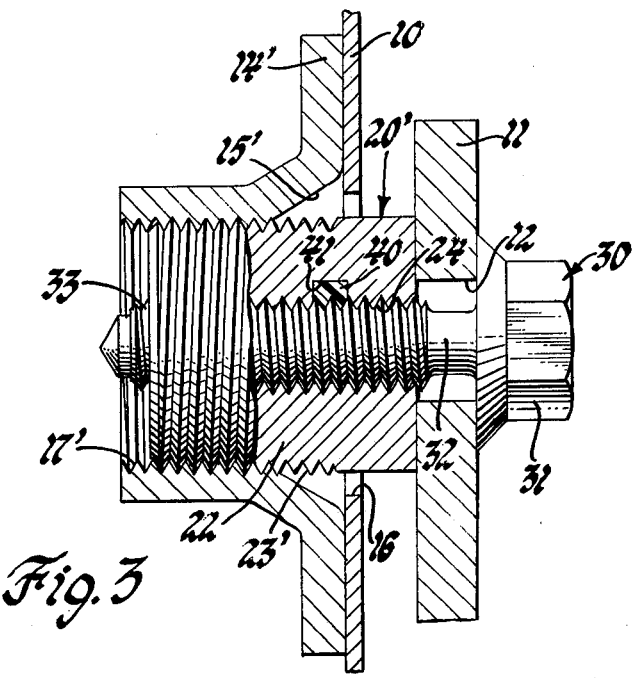

In the alternate embodiment of the shim nut and screw bolt assembly shown in FIG. 3, wherein like parts are identified by like reference characters, the shim nut 20' of this assembly is threaded into a large diameter nut 14' secured to the component 10 whereby the major outside diameter of the shim nut 20' is uniform throughout its axial extent, this external diameter, for example, corresponding to the outside diameter of the head 21 of the shim nut 20 of FIGS. 1 and 2, whereby the end of shim nut 20' will provide substantially the same clamping surface area, as the head 21, against which the component 11 can be secured.

At least a portion of the internal peripheral wall of the nut 14' formed by the aperture 15' therethrough is provided with internal threads 17' and the shim nut 20' is provided with complementary formed external threads 23'. The shim nut 20' is also provided with an aperture therethrough provided with internal threads 24 to threadably receive the threads 33 of the screw bolt 30 for the purpose previously described. In addition, the shim nut 20' is also provided with the nylon button 40 positioned in a suitable cavity 41 in the thread bore of this nut to provide resistance to threading of the screw bolt 30 into the shim nut 20' and thereby providing a driving torque from the screw bolt to the external threads 23' whereby the shim nut 20' can be rotated relative to the nut 14' fixed to component 10.

The use of the alternate embodiment of the shim nut and screw bolt assembly in securing the component 11 to component 10 is the same as that previously described relative to the embodiment of FIGS. 1 and 2.

It will be realized that although only one shim nut and screw bolt assembly has been shown to effect attachment of the components 10 and 11 together, with the shim nut of this assembly serving as a shim to hold these components in spaced apart relationship, a plurality of these assemblies could be used to effect attachment of these components together.

What is claimed is:

1. A shim nut and fastener device for retaining a first member having an aperture therein to a second member having an internally threaded aperture means therein extending from the surface thereof next adjacent the first member, with the first member being retained in spaced apart relation to the second member by said shim nut and fastener device; said shim nut and fastener device including a shim nut of tubular configuration having an end surface facing said first member and having external threads thereon in rotatable, substantially fully, threaded engagement with the internally threaded aperture means of the second member and having internal threads of an opposite pitch to said external threads extending through said shim nut, said shim nut being threadedly engaged in said internally threaded aperture means so as to initially have said end surface spaced from said first member; and a screw fastener having a head with an externally threaded shank extending therefrom inserted through the aperture of the first member into threaded engagement with said internal threads in said shim nut; self-locking means operatively associated with said threaded shank and with said internal threads in said shim nut whereby as said screw fastener is driven into said shim nut, said shim nut is caused to back out of the internally threaded aperture means of the second member whereby said end surface is brought into abutment against the first member after which the screw fastener can be further threaded into said shim nut until said head of said screw fastener abuts against the first member which is then sandwiched between said end surface of said shim nut and the head of said screw fastener.

2. A shim nut and fastener device for retaining a first member having an aperture therein to a second member having an internally threaded aperture means therein extending from one surface thereof next adjacent said first member, the first member being retained in spaced apart relation to the second member, said shim nut and fastener device including a shim nut of tubular configuration having a head and a shank extending therefrom, said shank having external threads thereon in rotatable threaded engagement with the internally threaded aperture means of the second member with said head positioned closely adjacent to said one surface of the second member, said shim nut having an internal threaded aperture therethrough, said internal threads of said shim nut being of an opposite pitch to said external threads, and a screw fastener having a head with an externally threaded shank extending therefrom inserted through the aperture of the first member into threaded engagement with said internal threads in said shim nut, said externally threaded shank and said internal threads of said shim nut having prevailing torque locking action relative to each other whereby as said screw fastener is driven into threaded engagement in said shim nut, said shim nut is caused to back out of the internally threaded aperture means of the second member away from said one surface of the second member into abutment against the first member after which the screw fastener can be further threaded into said shim nut until said head of said screw fastener abuts against the first member whereby it is then sandwiched between one end of the shim nut and the head of said screw fastener.

3. A shim nut and fastener assembly for rigidly securing together a pair of spaced apart components, one of the components having an internally threaded anchor means extending from one surface thereof next adjacent to the other component and the other component having an aperture therethrough, said shim nut and fastener including a shim nut and a screw bolt, said shim nut having external threads thereon threadedly received in said internally threaded anchor means with one end of said shim nut positioned closely to said one surface, said shim nut having an aperture therethrough providing an internal peripheral wall having internal threads of opposite hand to said external threads, said screw bolt having a head and an externally threaded shank extending therefrom to be received through the aperture in the other component into said one end of said shim nut in threaded engagement with said internal threads of said shim nut, one of said internal threads of said shim nut and said externally threaded shank having self-locking means associated therewith to provide prevailing torque locking action between said screw bolt and said shim nut whereby as said screw bolt is driven into threaded engagement in said shim nut, said shim nut is caused to back out of the internally threaded anchor means away from said one surface into abutment against the other component after which the screw bolt can be further threaded into said shim nut to secure the other component between said shim nut and said head of said screw bolt.

4. A shim nut and screw bolt assembly according to claim 3 wherein said self-locking means includes a radial outward extending cavity in said peripheral wall of said shim nut and a nylon button positioned in said cavity to be in interference relationship with said external threaded shank of said screw bolt.

* * * * *